US006408276B1

(12) United States Patent
Yu et al.

(10) Patent No.: US 6,408,276 B1
(45) Date of Patent: Jun. 18, 2002

(54) CREW OPTIMIZATION ENGINE FOR REPAIR OF PAIRINGS DURING IRREGULAR AIRLINE OPERATIONS

(75) Inventors: Gang Yu; Gao Song, both of Austin, TX (US)

(73) Assignee: CALEB Technologies Corp., Austin, TX (US)

( * ) Notice: Subject to any disclaimer, the term of this patent is extended or adjusted under 35 U.S.C. 154(b) by 0 days.

(21) Appl. No.: 09/364,156

(22) Filed: Jul. 30, 1999

(51) Int. Cl.$^7$ ................................. G06F 17/60
(52) U.S. Cl. ............... 705/7; 705/8; 705/9; 701/202
(58) Field of Search ............. 705/7, 8, 9; 703/6, 703/7; 701/202; 340/825

(56) References Cited

U.S. PATENT DOCUMENTS 6,253,147 B1 * 6/2001 Greenstein ................. 701/202

FOREIGN PATENT DOCUMENTS

EP          1072991 A2 * 7/2001   ........... G06F/17/60

OTHER PUBLICATIONS

Vance, Pamela H. et al. airline crew scheduling: A new formulation and desomposition algorithm. Operations Research to appear, 1994, pp: 1–32.*
Vance, Pamela H. et al. A heuristic branch–and–price approach for the airline crew scheduling problem., Jan–00–1900.*
Anderson, Erik et al. Crew pairing optimization. in operations Research in the Airline Industry, ed. Yu Gang, 1998 chapter 1.*
Anbil, Ranga et al. Recent advances in crew–pairing optimization at American Airlines. Interfaces, 1991, v21, pp. 62–74.*
Anbil, Ranga et al. Column generation and the airline crew scheduling problem. Documenta Mathematica Extra Volume ICM, 1998, pp. 677–686.
Guo Wei, gang Yu, and Mark Song, "Optimization Model and Algorithm for Crew Management During Airline Irregular operations", Journal of Combination Optimization 1, pp. 305–321, Kluwer Academic Publishers (1997), The Netherlands.
Mark Song, Guo Wei, and Gang Yu, "A Decision Support Framework For Crew Management During Airline Irregular Operations", Operations Research In The Airline Industry, pp. 259–286, Kluwer Academic Publishers (1998), United States.

* cited by examiner

Primary Examiner—Tariq R. Hafiz
Assistant Examiner—D. Robertson
(74) Attorney, Agent, or Firm—Gerald E. Lester

(57) ABSTRACT

An automated real time crew optimization engine for repairing crew problems including open flights, open pairings, and broken crews in airline operations, which generates multiple solutions in conformance with solution constraints by preprocessing the crew problems to generate potential solutions, and optimizing the potential solutions to provide optimized solutions. The preprocessing includes the use of self-connection methods, skipping-leg methods, and an extend-out-broken crew method. Potential solutions are generated by swap methods including a one-way swap method, a two-way swap method, and a three-way swap method. A depth-search-first algorithm and a shortest path algorithm are applied to the potential solutions to find optimal solutions.

19 Claims, 10 Drawing Sheets

CREW OPTIMIZATION ENGINE FOR REPAIR OF PAIRINGS DURING IRREGULAR AIRLINE OPERATIONS

FIELD OF THE INVENTION

The invention relates to decision support tools generally, and more particularly to an automated, real time system for curing crew problems arising from irregular airline operations as well as for analysis under any what-if scenarios.

BACKGROUND OF THE INVENTION

Airline operations may be disrupted by numerous perturbations including weather problems, aircraft mechanical problems, and air traffic control (ATC) problems. When under the influence of such perturbations, the airline is said to experience irregular operations, which may result in flight delays, flight cancellations, flight diversions, equipment substitutions, and crew rescheduling.

The crew rescheduling involves matching crews with a recovery flight schedule and acceptable fleet type as soon as possible in a cost effective way, while ensuring conformance with crew legalities such as the FARs (Federal Aviation Regulations), union contracts, and company policies.

The following published articles are of general interest: "Optimization Model and Algorithm for Crew Management During Airline Irregular Operations", by Guo Wei, Gang Yu, and Mark Song, Journal Of Combinatorial Optimization, Kluwer Academic Publishers (1997); and "A Decision Support Framework for Crew Management During Airline Irregular Operations", by Mark Song, Guo Wei, and Gang Yu, Operations Research In The Airline Industry, Kluwer Academic Publishers (1998).

The algorithms described in the above publications are very similar. The main features of these algorithms are their use of the space-time network model, in which problems with irregular operation can be physically represented by a network using four types of nodes and five types of network arcs. As a result of this network representation, a mathematical model can be formulated to reflect the problem at hand.

For relatively small problems (number of cities less than 10, number of pairings less than 5, number of flights less than 20), use of the model can achieve an optimal solution. If the size of a problem increases, however, a heuristic method has to be applied in order to get an acceptable solution. The heuristic methods described in these two publications are centered at the decomposition of the given problem, so that a large problem can be divided into a number of smaller problems such that each smaller problem contains exactly one broken pairing.

For each smaller problem, the algorithm calls for setting up a sub-network, solving a shortest path network and using a depth-first search method to fix a broken pairing. Going through each of these iterations for any normal airline irregular operation problem, the costs in terms of solving time can be very expensive and impractical to support decision making in a real time environment.

In the current invention, Directly-Connected and Indirectly Connected, and Extend-Out Methods are used to first preprocess a problem. These preprocessing methods prove to be very effective in reducing problem size by fixing a large portion of problems. Swap Methods also are used to further fix a problem and improve solution quality. A problem is decomposed into smaller problems by either looking at a pairing of broken parings, or a group of three parings to fix. Finally, the current invention sets up a network of open flights, and uses the depth-first-search algorithm to match the solutions from the decomposed problem to yield solutions for the overall problem. Also, a shortest path method is applied iteratively to generate open pairings based on the open flights. However, the network is generated only once, and during each iteration only the costs of the network need to be reset. This approach is far more efficient than regenerating the entire network as proposed by the above publications. Also, due to the effectiveness of the preprocessing, and the swap method, only a small number of open flights left at the final stage of generating open pairings. Thus, only a small number of iterations necessary. Comparatively, the current invention is far more effective and efficient than the processes proposed in the above publications.

SUMMARY OF THE INVENTION

An automated real time crew optimization engine for repairing crew problems including open flights, open pairings, and broken crews in airline operations, which generates multiple solutions in conformance with solution constraints by preprocessing the crew problems to generate potential solutions, and optimizing the potential solutions to provide optimized solutions.

In one aspect of the invention, the preprocessing includes the use of self-connection methods, skipping-leg methods, and an extend-out-broken crew method.

In another aspect of the invention, the self-connection methods include a self-directly-connected method, and a self-indirectly connected method.

In a further aspect of the invention, the skipping-leg methods include a forward leg skipping method and a backward leg skipping method.

In a still further aspect of the invention, swap methods including a one-way swap method, a two-way swap method, and a three-way swap method also are used to generate potential solutions.

In yet a further aspect of the invention, a depth-search-first algorithm, and a shortest path algorithm are applied to the potential solutions to find optimal solutions.

In still another aspect of the invention, a network of open flights is created, and through use of the shortest path algorithm, a flight sequence that involves as many open flights as possible, and which avoids as many deadhead flights as possible is saved as an open pairing. Thereafter, reserve crews assignments to the open pairings are optimized.

DESCRIPTION OF PREFERRED EMBODIMENTS

Figure 1:
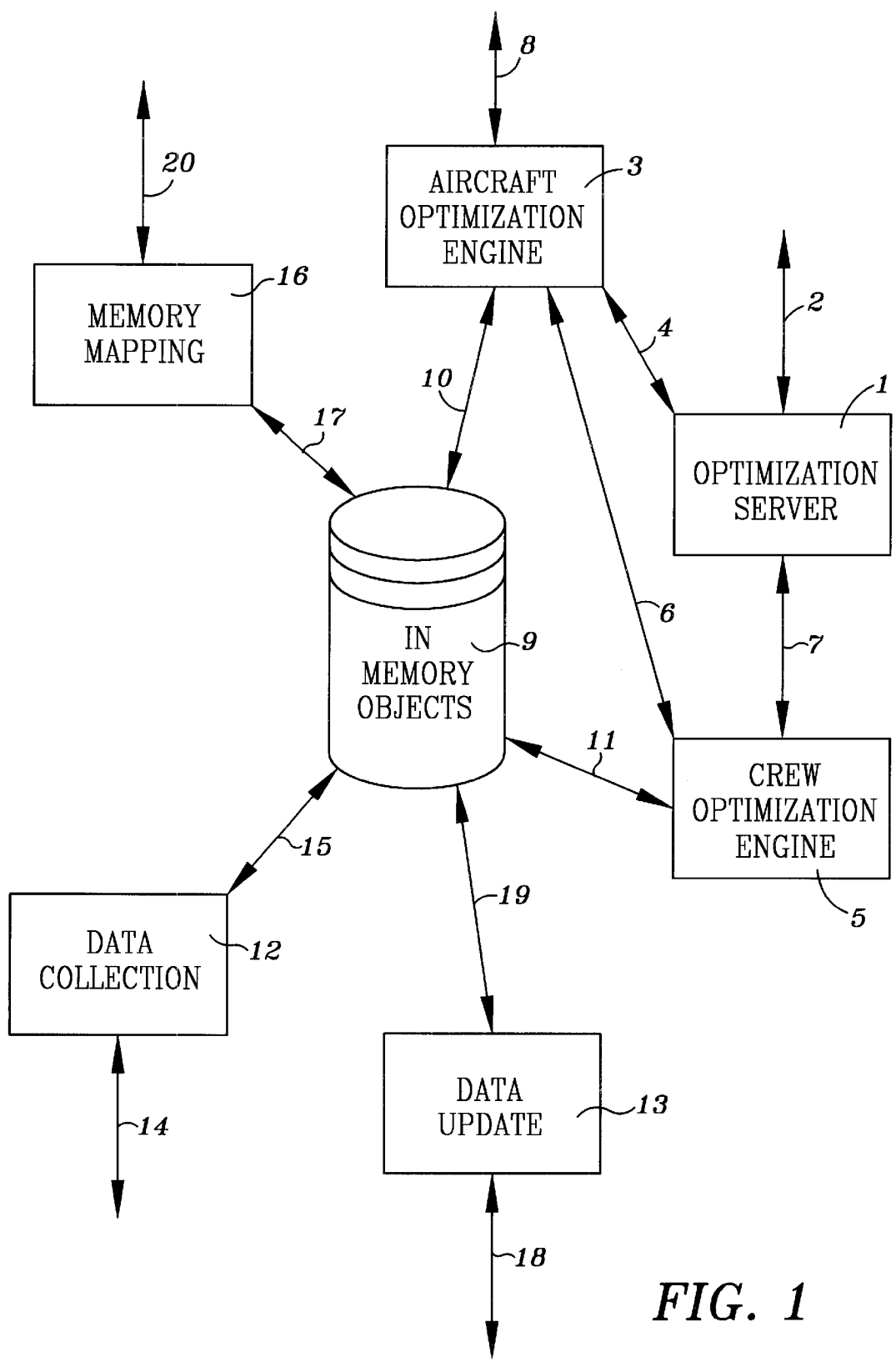
FIG. 1 is a functional block diagram of an environment in which the crew optimization engine of the present invention is a part.

The following definitions, whether appearing in lower case or with capitalizations, are used throughout the specification to describe the invention:

1. A Flight Leg may be described by three sets of parameters. Each set consists of a departure city, an arrival city, a departure time, and an arrival time. The three sets used are referred to as the Scheduled, Estimated, and Actual sets.

The Scheduled Set identifies original scheduled departure and arrival airports, and times of departure and arrival of a flight.

The Estimated Set identifies departure and arrival airports, and times of a flight in progress beginning from the time the flight leaves the gate.

The Actual Set reports the actual activities of a flight as the flight proceeds through each Flight Leg of the flight.

2. The status of a flight may be described by the following:

"On Time" means that a flight will arrive at its scheduled destination no later than the scheduled arrival time.

"Delayed" means that a flight will arrive at its scheduled destination at a time later than the scheduled arrival time.

"Canceled" means that a flight is canceled for any reason.

"Rerouted" means that a flight will arrive at an airport other than the originally scheduled destination airport.

3. A "Pairing" means a sequence of flight legs that starts at a crew base or originating airport, and ends at the same crew base. A Pairing can last one-day, or span over several days. Pairings are categorized according to fleet type. For any given Pairing, all flights within the Pairing must require the same fleet type (same equipment, i.e. B727, B737, MD80).

4. "Connection Time" means that for any consecutive Flight Legs of a given Pairing, the time between the time of arrival of the first Flight Leg at a scheduled airport, and the time of departure of a second Flight Leg from the airport.

5. "Rest Time" means the time between an arrival time of a first of two consecutive Flight Legs, and a next day departure time of a second of the two consecutive Flight Legs.

6. "Total Duty Time" means the accumulated time between the starting point of a first Flight Leg of the day, and the end of debriefing after the last Flight Leg of the day.

7. "Total Flight Time" means the accumulation of time periods between departure times and arrival times for each Flight Leg of a day.

8. "Open Flight" or "Open Leg" means a flight in which one or more crew positions are open. That is, no crewmember has been assigned to the position. This situation arises, by way of example, when a crew member is sick and is taken off of a Flight Leg, when crew members exceed duty time or flight time constraints required by the FARs, and when a regular crew is removed from one Flight Leg and assigned to cover another Flight Leg.

9. "Open Pairing" refers to the situation in which same positions of all Flight Legs of a flight sequence are open. Such situations occur when no crewmembers are assigned to the Pairing in the original flight schedule, and when crewmembers originally assigned to the Pairing have been reassigned to other routes.

10. "Broken Crew" occurs when an assigned Pairing cannot be continued. For example, when a crew exceeds its duty time or flight time constraints, when Flight Legs of the assigned Pairing are canceled, or where due to flight delays insufficient connection time between flights exists for the crew to change flights and continue their assigned Pairing, 11. An "arc" is defined as a line that connects two nodes. In the algorithm used to solve our network problems, costs are assigned to an arc. For instance, if I and J are two nodes, then a(i, j) is used as a variable with the value equal to the cost assigned to the arc. In our network problems, an arc either represents a distance in space such as a flight route (when the arc connects the flight's departure city and arrival city), or it represents duration in time at a given city (when the arc connects one flight's arrival city to next flight's departure city as a given station).

12. A "Reserve Crew" is a crew who has not been assigned to any Pairing, but are on duty and available.

13. The sets referred to in the discussions below are as follows:

The scheduled set, estimated set and actual set for a given flight refer to the two time parameters (departure time and arrival time), and two space parameters (departure city and arrival city). The word "set" refers to these parameters under three different scenarios. There is no physical data structure for these sets.

Open leg sets and Open flight sets are used interchangeably.

Open flight sets store the flights that are open in some position or positions. When an open flight exists, it is a problem type that the optimization engine needs to fix.

Open pairing sets store the pairings that are open in some position or positions. When it occurs, it is also one of the problem types that the optimization engine needs to fix.

Broken Crew sets store all Broken Crew Information (BCI) records that need to be fixed.

Referring to FIG. 1, a functional block diagram of the system environment in which the invention operates is shown, where an Optimization Server 1 (which in the preferred embodiment is an HP K-570 running an 11.x HPUX operating system), in electrical communication with a user by way of a bi-directional communication path 2 receives a request for optimal solutions to a specific flight schedule disruption. In response to the request, the Optimization Server 1 initializes an Aircraft Optimization Engine 3 by way of a bi-directional communication path 4, and provides the Aircraft Optimization Engine 3 a filename of an Aircraft Problem Specification. The Aircraft Optimization Engine 3 accesses the Aircraft Problem Specification by way of a bi-directional communication path 8, and generates a set of optimal solutions including aircraft reassignments, rescheduling, and reroutings, to overcome the disruption. The solutions are transmitted over communication path 4, and through the Optimization Server 1 and bi-directional path 2 to the user.

The Aircraft Optimization Engine 1 in turn initializes a Crew Optimization Engine 5 by way of a bi-directional communication path 6 to determine whether the optimal flight solutions are efficiently supported by flight and service crews. The Crew Optimization Engine 5, upon being initialized, receives a Crew Problem Specification from the user by way of communication path 2, Optimization Server 1, and a bi-directional communication path 7. The Crew Problem Specification includes flight records, pairing records, and broken crew information records. The crew solutions generated by the Crew Optimization Engine 5 are supplied by way of the communication path 7, Optimization Server 1, and communication path 2 to the user.

During operation, the Aircraft Optimization Engine 3 and the Crew Optimization Engine 5 communicate by way of bi-directional communication paths 10 and 11, respectively, with a memory system such as disk storage unit 9 having stored therein memory objects which in the preferred embodiment are C++ objects containing all of the data used by the optimization engines to solve problems. For example, the C++ object for each flight would capture all information about a given flight. More specifically, a flight object would contain object members such as a flight's departure city, arrival city, departure time, arrival time as well as crewmembers that are assigned to this flight. The object would also contain some basic member functions that allow the engine to access these data members and set/reset them. The C++ objects in turn are created and updated by the Data Collection Unit 12 and the Data Update Unit 13, respectively. More particularly, the Data Collection Unit 12 receives flight data, open flight data, crew data, reserve data, pairing data and open pairing data from the user by way of bi-directional communication path 14. The Data Collection Unit 12 also creates C++ objects which are supplied by way of a bi-directional communication path 15 for storage in the disk storage unit 9, at memory locations specified by a Memory Mapping Unit 16 by way of a bi-directional communication path 17. Further, the Data Update Unit 13 receives revisions to the C++ objects from the user over a bi-directional communication path 18, and supplies corrections through a bi-directional communication path 19 to the objects identified by the Memory Mapping Unit 16.

The following data is needed for setting up the database for the Crew Optimization Engine: A. Given a flight, the following information is necessary:

Flight number—Flight ID used in airline operation. For example, Flight 1384.

Flight key—key to the database table for data retrieval. In the database of the present invention, all flight records are saved in an array structure, and the key of a given flight is simply the index to the array where the flight record is saved.

Departure city—Flight scheduled departure city.

Arrival city—Flight scheduled arrival city.

Scheduled departure time—Flight scheduled departure time. Original time used in airlines is the time local to the departure city. In the database, it is converted into GMT time.

Scheduled arrival time—Flight scheduled arrival time. Local time to the arrival city in the original form, and GMT in the database.

Estimated departure time—Estimated local departure time based on the current operational conditions (local in the original form and GMT in the database).

Estimated arrival time—Estimated local arrival time based on the current operational conditions (local in the original form and GMT in the database).

Actual departure time—Actual departure time of the flight (local in the original form and GMT in the database). This information only becomes available once a flight actually departs from its departure city.

Actual arrival time—Actual arrival time of the flight (local in the original form and GMT in the database). This information becomes available when a flight is actually landed at the destination.

Fleet type—Equipment type of the aircraft scheduled to take the flight.

Crew on flight—Information about crewmembers who are going to take the flight.

It consists of the following data:

Position—Crew position such as Captain, First Officer, Second Officer and Flight Attendant Crew ID—For each required position, if a crew is assigned to a given position.

If, however, no crew has been assigned to the position, the term OPEN is used to indicate an open position for this flight.

Duty status—When a crew has been assigned to a position, the duty status is given to indicate that the crew either performs a duty on the flight (taking the flight as whatever the position the crew is assigned to) or deadhead on the flight (not taking the flight as whatever the position requires).

Pairing ID—When a crew has been assigned to a required position, the pairing ID indicates that this flight is one of the flight legs that form the pairing, and that the crew has been assigned to the pairing.

In an object oriented language environment, all the information described above can be stored in a flight record as an object, and all the flight records are saved in an array structure for fast retrievals.

Given a crew, information needed is as follows:

Crew ID—A crew's unique identification.

Crew key—key to the database table for data retrieval. In our database, all crew records are saved in an array structure, and the key of a given crew is simply the index to the array where the crew record is saved.

Position—Flight position the crew is qualified to take.

List of assignment—List of pairings and their dates that the crew is assigned to perform for a given assignment period. All pairings are identified by their IDs.

Summary data—The summary data consists of information such as the time when the crew last had time off, and the time that the crew is scheduled for the next time off, and finally, how much duty time the crew has accumulated so far within the assignment period.

Crew qualification—data related to the crew's qualification check such as when was the crew's last training period, when is the next training period, and special airports that this crew is not qualified to land or take off an airplane.

In an object oriented language environment, all the information described above can be stored in a crew record as an object. And all the crew records are saved in an array structure for fast retrievals.

C. Given a pairing, the following information is necessary:

Pairing ID—unique ID of the pairing.

Pairing key—key to the database table for data retrieval. In our database, all pairing records are saved in an array structure, and the key of a given pairing is simply the index to the array where the pairing record is saved.

Start time—pairing's start time, i.e. the brief time of the very first flight leg of the pairing.

End time—pairing's end time, i.e. the debrief time of the very last flight leg of the pairing.

Base—A crew base city where this pairing originated.

Fleet type—equipment type of the aircraft required for all the flights in the pairing.

List of the flights—a sequence of all the flight legs that are assigned to the pairing in an increasing time order.

In an object oriented language environment, all the information described above can be stored in a pairing record as an object. And all the pairing records are saved in an array structure for fast retrievals.

The Memory Mapping Unit 16 receives control signals from the user over a bi-directional communication path 20, and in response thereto identifies the addresses of the C++ objects in the disk storage unit 9 that are being operated upon. By means of the Memory Mapping Unit 16 and the Data Update Unit 13, the user is able to keep the data stored in the Disk Storage Unit 9 current with the data being supplied to the user by way of communication path 2.

Thus, at any given time, the C++ objects of the Disk Storage Unit 9 reflect the existing flight environment, including identification of protected flights which are not to be canceled or delayed; flight sequences or routes for each aircraft; the stations or airports to be used by the aircraft; the fleets assigned to each station; station closure times; fleet arrival and departure curfews (times during which an aircraft is allowed to land and take-off); inviolable and violable maintenance schedules; aircraft seat capacities; fleet operational ground times; operations and flight disruption costs; sub-fleet disruption costs; and revenue and passenger information for each scheduled flight.

It is to be understood that Aircraft Optimization Engine 3, Crew Optimization Engine 5, and Optimization Server 1 each may be microprocessors.

Problems are detected and formulated during the course of the database updates. Upon receiving each message, the system analyzes the current operations, checks for any problems, and formulates and records any problems that are detected.

Problems with Open Pairings are explicitly indicated by the Pairing update messages and the crew update messages. Problems with Open Flights are explicitly indicated by the flight update messages. Problems with Broken Crews, however, are detected as the result of current operation analysis.

The following describes how a problem is recorded.

Open Flights are recorded in the form of a regular flight record, which has the following main features:
 a) Flight number: airline assigned flight ID.
 b) Flight index: entry index to the flight table in the database.
 c) Departure city index: entry index to the city table in the database.
 d) Arrival city index: entry index to the city table in the database.
 e) Departure time: flight departure time in terms of number of minutes with regard to a predefined reference point.
 f) Arrival time: flight arrival time in terms of number of minutes with regard to a predefined reference point.
 g) Fleet type: equipment type of the flight.
 h) Crew on flight: set of records both in terms of crew index (entry index to the crew table in a database) and crew position index.

All Open Flights are saved in terms of their flight indices in an Open-Leg Set.

Open Pairings are recorded in the form of regular Pairing records. A Pairing record captures the following main features:
 a) Pairing number: airline assigned Pairing ID.
 b) Pairing starting time: Pairing starting time in terms of number of minutes with regard to a reference point.
 c) Pairing ending time: Pairing ending time in terms of number of minutes with regard to the reference point.
 d) Base: city index where the first leg of a Pairing begins.
 e) Fleet type: equipment type of the flights assigned to the Pairing.
 f) List of flights: list of all flights in the flight sequence that consists of a Pairing. All flights are represented by their indices.

All Open Pairings are stored in terms of their pairing indices in an Open Pairing set.

Broken Crews are recorded in the form of Broken Crew Information (BCI) records. A BCI record has the following information about Broken Crews:
 a) First_City: city where the crews are before the Pairing was broken.
 b) First_Time: time when the crews become available at the First_City.
 c) Second_City: city where the crews are supposed to be. This could be either their next flight's departure city, or their base city where they must return after performing the Pairing.
 d) Second_Time: time when the crews are supposed to be at the Second_City.
 e) First_Flight: the index of the flight that the crew just served before the Pairing gets broken. If the Pairing is broken at its first leg, then the index is set to "−1" to indicate that the crews are now at their base station.
 f) Second_Flight: the index of the flight that the crews are supposed to take next at the Second_City. If the Second_City is a crew base station, and the Second_Time is the Pairing ending time, the index is set to −1 to indicate that the crews need to return to their base or originating station now.
 g) Fleet type: the fleet type of the Open Pairing.
 h) Swap Rank: integer index to flag how a BCI can be fixed. If the BCI can be fixed directly (i.e. its First_City is the same as its Second_City, all flights in between are canceled flights), the Swap Rank is set to "0". A BCI with Swap Rank set to "0" is called a Self-Directly-Connected BCI. If the BCI can be fixed indirectly (i.e. all crewmembers can deadhead from the First_City to Second_City by the Second_Time by skipping all canceled flights), the Swap Rank is set to "1". These types of BCIs are called Self-Indirectly-Connected BCI. Both Self-Directly-Connected and Self-Indirectly-Connected BCIs are called Self-Connected BCIs. If a BCI can be fixed by skipping some its non-canceled flights, the Swap Rank is set to "2". If, however, the crew of a BCI can not be sent back to its base by the original returning time, the Swap Rank would be set to "−1" to indicate that all the crew members on this Pairing will have to be extended out to a later time. These BCIs are called non-Self-Connected BCIs.
 i) Two-way swap set: set of other BCIs with which the BCI under consideration can be fixed by using a technique called a Two-Way Swap.

j) Three-way swap set: set of other two BCIs with which the BCI under consideration can be fixed by using a technique called a Three-Way Swap.

k) Fixed Pairing: list of flight indices in sequence as a result of a Paring being fixed in some way. In the case where the Swap Rank is set to "0", the Pairing would simply be the original Pairing excepting all canceled flights that have been removed. If the Swap Rank is set to "1", the Fixed Pairing would be similar to the original Pairing with all the canceled flights being replaced by a sequence of flight legs as a deadhead path. If the Swap Rank is set to "2", the Fixed Pairing would consist of some of its original flights, with a deadhead flight sequence replacing some of its original canceled and non-canceled flights. The Fixed Pairing under the above three cases stands as a possible solution, if no better solution can be found later during the solution generation stage. In that event, the Fixed Pairing becomes a BCI's final solution. However, in the case when the Swap Rank is set to "−2", the Fixed Pairing would be the final solution, where the crew members will skip all of the canceled flights and some of the non-canceled flights, and be back to their base by a time later than the originally scheduled return time.

All Broken Crews are stored in terms of the Open Pairing indices in a Broken Crew set.

Upon receiving a user request with a Crew Problem Specification, the system will have the following user request parameters to determine which problems to solve:

a) Request Time: Time point when a request is received.

b) Problem Start Time: A starting point of a user-defined time window (along with the Problem End Time described below), within which the system identifies problems to solve.

c) Problem End Time: An end point of a user-defined time window, within which the system identifies problems to solve.

d) Problem Recover Time: A time point by which all defined problems are to be solved. This also is a user-defined parameter.

e) Problem Time Window: A time window starting from the Problem Start Time to the Problem End Time. This window defines the problem scope. The engine will look at the problems that fall within this time window. Note, the Request Time is earlier than the Problem Start Time (otherwise it does not make sense to solve problems that already occurred in the past, as the engine only solves the problems currently affecting the operations). The Problem Recover Time is later than the Problem End Time.

f) Problem Fleet Type: The fleet type for which a user desires a solution.

Based on the above parameters, the system extracts problems according to the following criteria:

a) If an Open Leg is assigned the same fleet type as requested, and its departure time falls within the Problem Time Window, the open leg is extracted as a part of the problem.

b) If an Open Pairing is assigned the same fleet type as requested, and its starting time falls within the Problem Time Window, the Open Pairing is extracted as a part of the problem.

c) If a Broken Crew Information (BCI) record includes a same fleet type as requested, and its First_Time falls within the Problem Time Window, the BCI is extracted as part of the problem.

Figure 2:
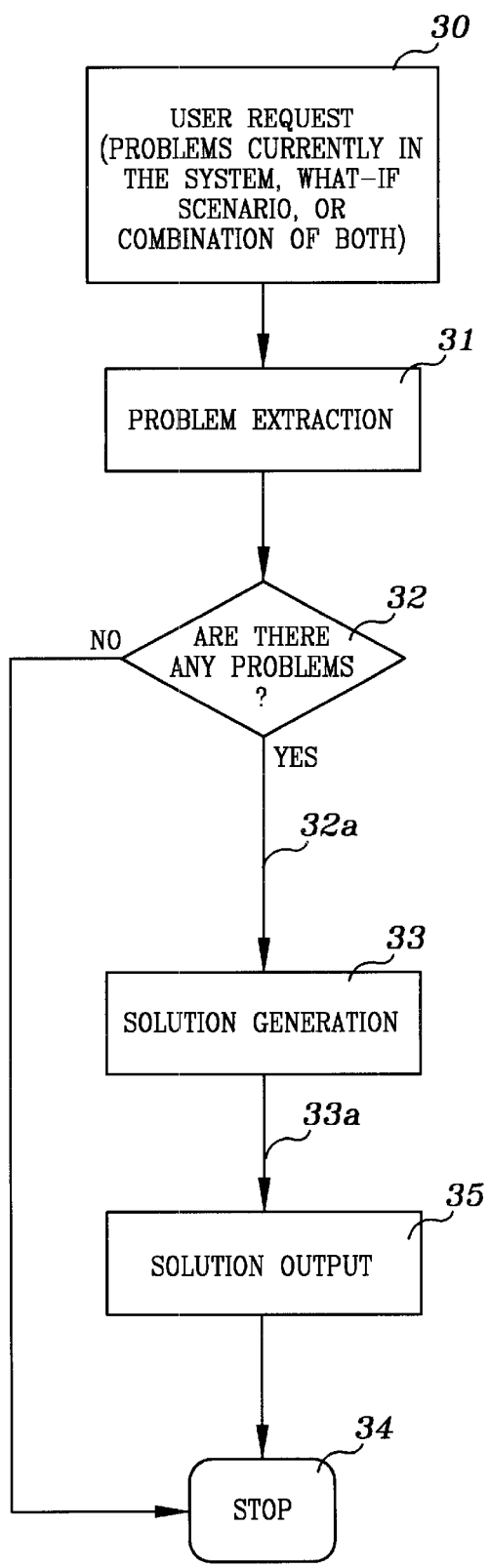
FIG. 2 is a logic flow diagram of the operation of the invention.

Referring to FIG. 2, the above-narrated process is illustrated in logic flow diagram form. At logic step 30, a user may request that a currently existing problem be solved, or request the Crew Optimization Engine to generate alternative solutions based upon alternative solution conditions (referred to as the "what-if" scenario, such as "What if some flights are canceled?"). From logic step 30, the logic flow process moves to logic step 31 where flight schedule problems including open flights, open pairings and broken crews are recorded. If any of the problems fit within the user request parameters (also referred to as user requirements and solution constraints), they are extracted. From logic step 31, the logic flow process continues to logic step 32 to determine whether any Broken Crew, Open Flight, or Open Pairing problems exist. If no such problems are extracted, the logic flow process jumps from logic step 32 to logic step 34 where the optimization process is terminated. If problems have been extracted, however, the logic flow process continues from logic step 32 and along logic path 32a to logic step 33.

At logic step 33, alternative solution conditions are generated to fix the Open Flight, Open Pairing, and Broken Crew problems that have been extracted. Thereafter, the solutions are output to the user at logic step 35, and the logic flow process proceeds to logic step 34 to await receipt of another user request.

Figure 3:
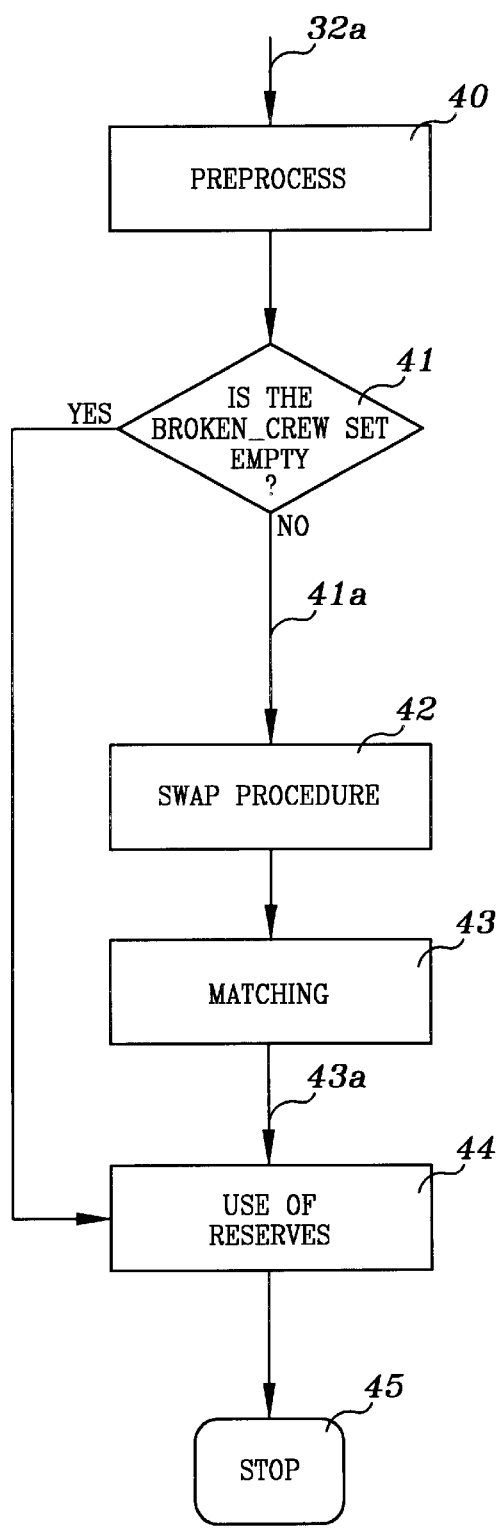
FIG. 3 is a logic flow diagram of the solution generation occurring at logic step 33 of FIG. 2.

The solution generation performed at logic step 33 of FIG. 2 is illustrated in more detail in FIG. 3. With the problem to be solved being identified according to the above criteria, the system generates a solution in accordance with the process steps referred to as Preprocessing, Crew Swapping, and Matching. The logic flow process enters by way of logic path 32a, and proceeds to logic step 40 where the first operation of a solution generation process, Preprocessing, takes place. A BCI record is taken from a Broken Crew Set, and an attempt to fix the Broken Crew problem is made by using a Self-Connected Method (as later described by example below). If unsuccessful, the Broken Crew problem is subjected to Skip-Leg Methods. If the Skip-Leg Methods are unsuccessful, then an Extend-Out-Broken-Crew Method is used to fix the Broken Crew problem. If the Broken Crew problem is fixed at logic step 51, the logic flow process jumps from logic step 52 to logic step 56.

From logic step 40, the logic flow process continues to logic step 41 to determine whether any further BCI records exist in the Broken Crew set. If not, the solutions proposed at logic step 41 are optimized by proceeding along a logic path 41a to apply a Swap Method at logic step 42, a Matching Method at logic step 43, and a Use-Of-Reserves Method at logic step 44. In the Matching Method, the generally known depth-search-first algorithm as disclosed at page 75 of "Combinatorial Optimization Algorithms and Complexity", by Christos H. Papadimitrion and Kenneth Steiglitz, Prentice Hall, Inc. (1982). Thereafter, the optimized solutions are recorded and the solution generation process ends at logic step 45. The logic flow process then returns to logic path 33a of FIG. 2.

If the Broken Crew set is found to be empty at logic step 41, the logic flow process jumps from logic step 41 to logic step 44, where the process continues as before described.

Figure 4:
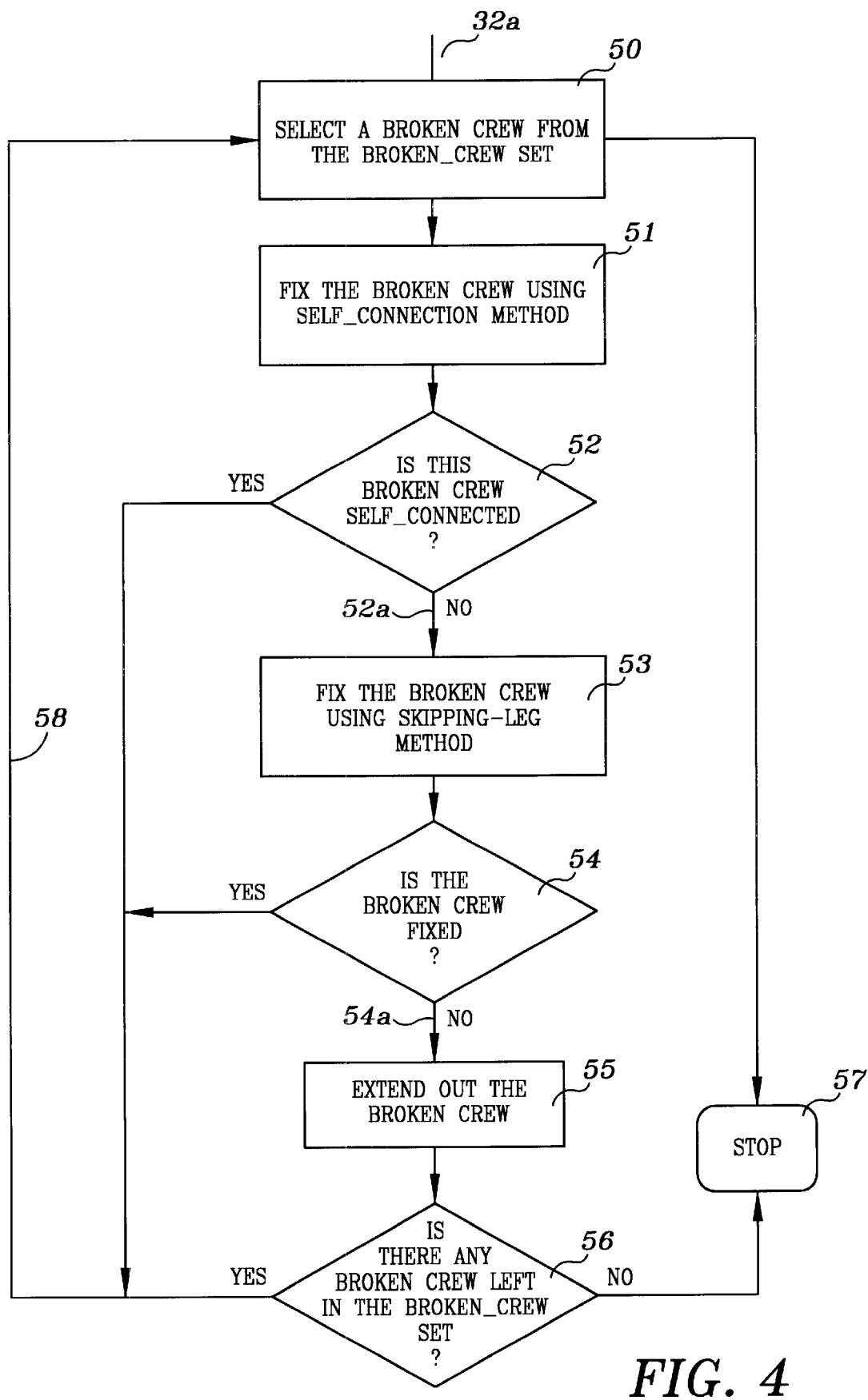
FIG. 4 is a logic flow diagram of the Preprocess method occurring at logic step 40 of FIG. 3.

The Preprocess operation of logic step 40 of FIG. 3 is illustrated in more detail in FIG. 4, where the logic flow process enters by way of logic path 32a, and a BCI record is taken from the Broken Crew Set at logic step 50. Thereafter, at logic step 51, an attempt to fix the broken crew problem by a Self-Connection Method (as described in more detail below) is made. From logic step 51, the logic flow process continues to logic step 52 to determine whether the Self-Connection Method was successful. If not, the logic flow process proceeds along logic path 52a to logic step 53, where an attempt is made to fix the Broken Crew problem by using a Skipping-Leg Method.

From logic step 53, the process flows to logic step 54 to determine whether the Broken Crew problem has been fixed. If not, the logic flow process continues along logic path 54a to logic step 55 to apply an Extend-Out-Broken-Crew Method to arrive at a fix for the Broken Crew problem. The logic flow process then continues to logic step 56 to determine whether any more Broken Crew records exist in the Broken Crew set. If not, the Preprocessing Stage of the solution generation is terminated at logic step 57, and the logic flow process jumps to logic step 41 of FIG. 3. If a Broken Crew record still exists in the Broken Crew set, however, the logic flow process loops back from logic step 56 by way of logic path 58 to logic step 50, and the process continues as before described. Also, if either a Broken Crew problem is fixed by the Self-Connected Method at logic step 52, or a Broken Crew problem is fixed at logic step 54, the logic flow process jumps to logic step 56, where the process continues as before described.

Lastly, if no BCIs exist in the Broken Crew Set at logic step 50, the logic flow process jumps from logic step 50 to logic step 57 to continue as before described.

Figure 5:
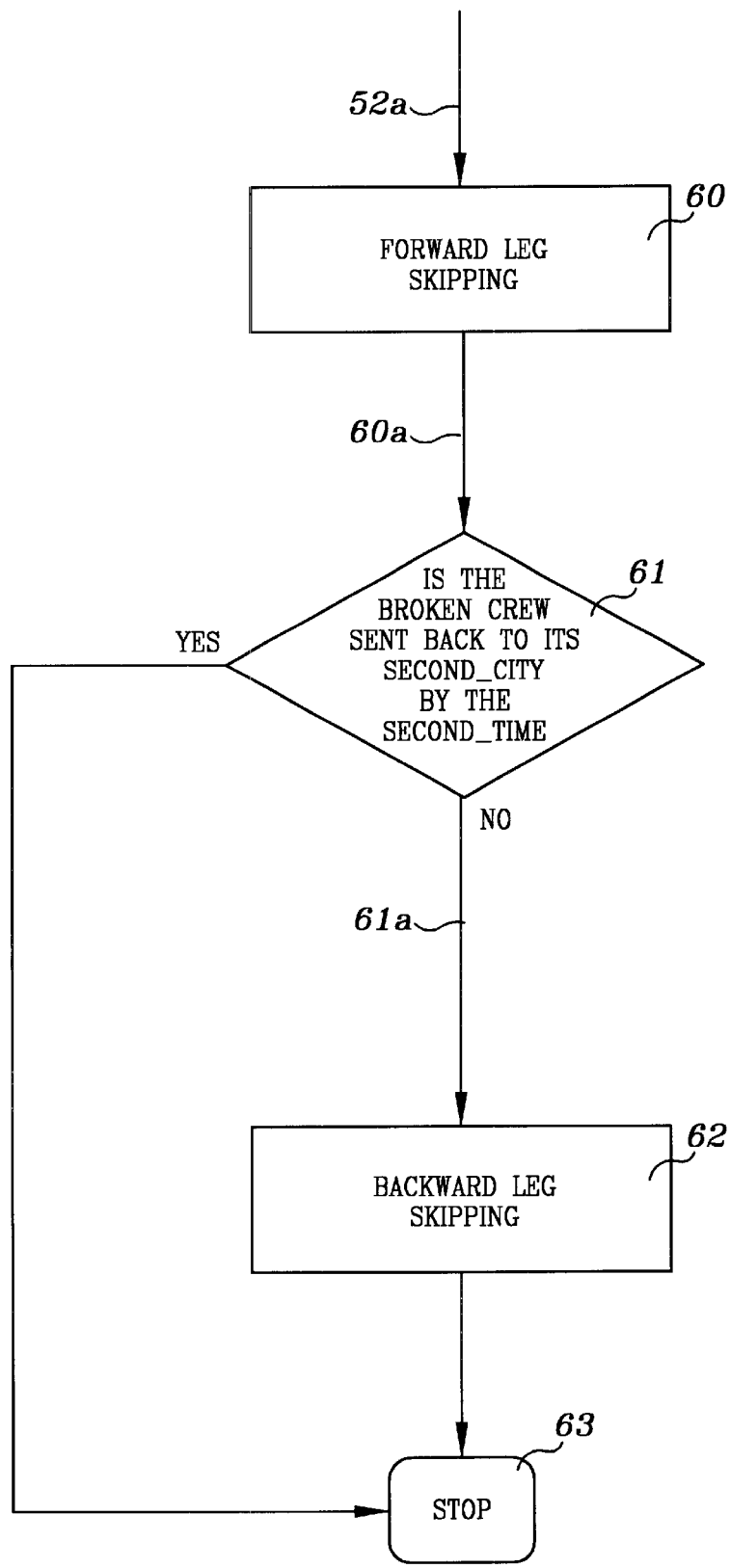
FIG. 5 is a logic flow diagram of the skipping-leg process occurring at logic step 53 of FIG. 4.

The Skipping-Leg Method of logic step 53 of FIG. 4 is illustrated in more detail in FIG. 5, where the logic flow process enters by way of logic path 52a and proceeds to logic step 60 to apply a Forward Leg Skipping Method. Thereafter, at logic step 61, it is determined whether the Broken Crew problem has been fixed by skipping a scheduled destination, and by proceeding to a next occurring destination within the time scheduled for arrival at the next occurring destination. If not, the logic flow process continues along logic path 61a from logic step 61 to logic step 62, where a Backward Leg Skipping Met hod is employed to correct the Broken Crew problem. From logic step 62, the logic flow process proceeds to logic step 63 to end the operation of the Skipping Leg Method, and proceed to logic step 54 of FIG. 4. If the Forward Skipping Leg Method is determined to have been successful at logic step 61 of FIG. 5, and the Broken Crew problem has been fixed by skipping the scheduled destination, the crew is returned to its regularly scheduled flight at a next occurring destination. The logic flow process then jumps from logic step 61 to logic step 63 to continue as before described.

Figure 6:
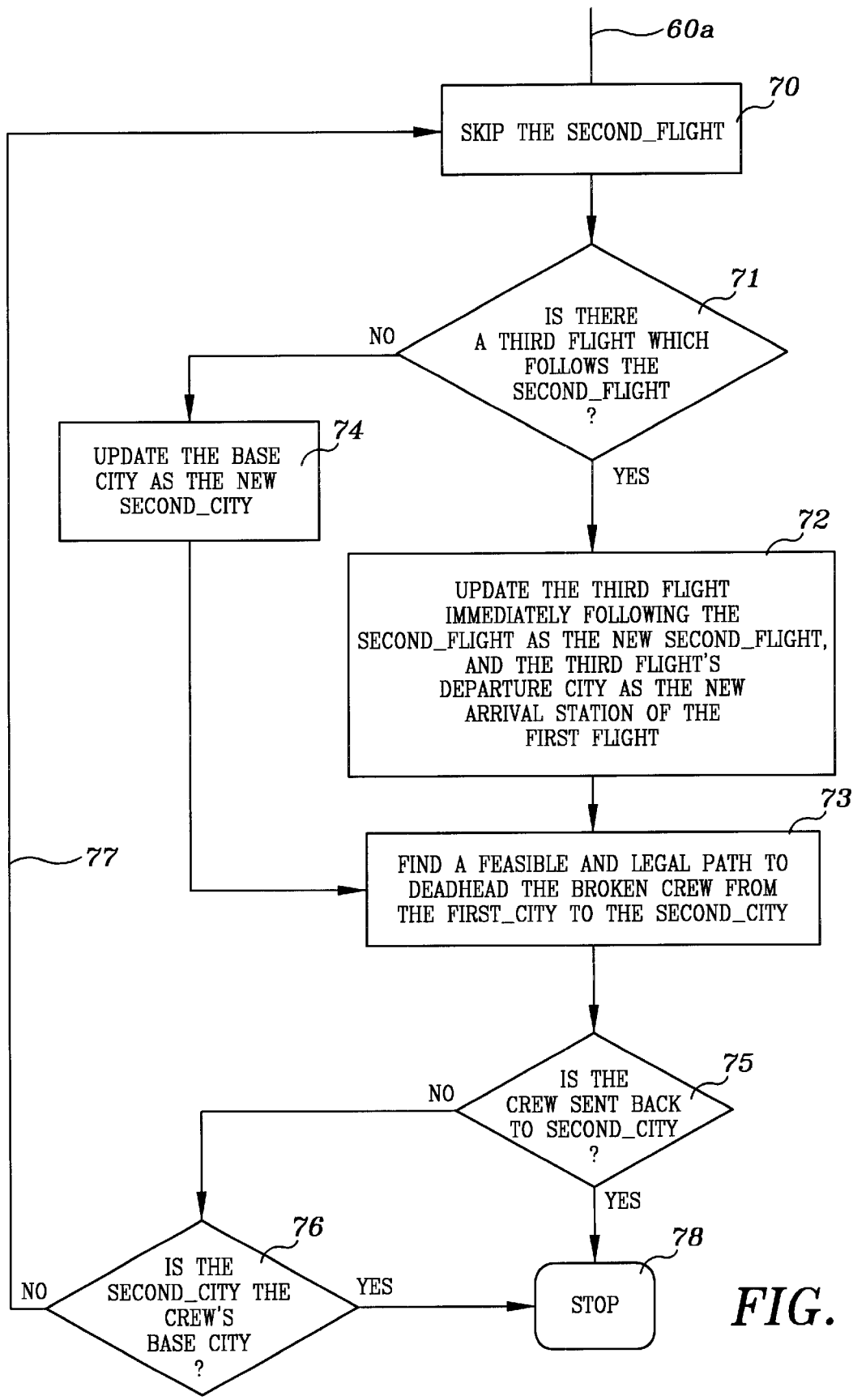
FIG. 6 is a logic flow diagram of the Forward-Leg Skipping Method occurring at logic step 60 of FIG. 5.

Referring to FIG. 6, the Forward Leg Skipping Method is illustrated in more detail. The logic flow process enters by way of logic path 60a and proceeds to logic step 70, where the flight (referred to as the Second_Flight) which departs from the scheduled destination after the immediately preceding flight (a First_Flight) is skipped. Next, a determination is made at logic step 71 whether the flight schedule includes a third flight that occurs after the skipped Second_Flight. If so, at logic step 72 the flight schedule is updated to indicate that the third flight is the Second_Flight, and that the third flight's departure station is the new arrival station of the Second_Flight.

From logic step 72, the logic flow process moves to logic step 73 to find a deadhead path (from the departure station of the First_Flight to the new arrival station of the First_Flight) which does not violate the constraints of the user's request parameters as before described.

If no third flight following the skipped Second_Flight is found at logic step 71, the logic flow process jumps from logic step 71 to logic step 74, where the flight schedule is updated to indicate that the original or base station is the new arrival station of the First_Flight. Thereafter, the logic flow process continues to logic step 73 as before described. From logic step 73, the logic flow process moves to logic step 75 to determine whether the Broken Crew has been sent back to its originating or base station. If not, the process jumps to logic step 76 to check whether the currently indicated destination of the First_Flight is the crew's original or base station. If not, the logic flow process loops back along logic path 77 to logic step 70 to continue as before described.

If it is determined at logic step 75 that the Broken Crew has been sent back to its originating or base station, or at logic step 76 that the currently indicated destination of the First_Flight is the crew's base station, then the logic flow proceeds to logic step 78 to cease the operation of the Forward Leg Skipping Method and jump to logic step 61 of FIG. 5.

Figure 7:
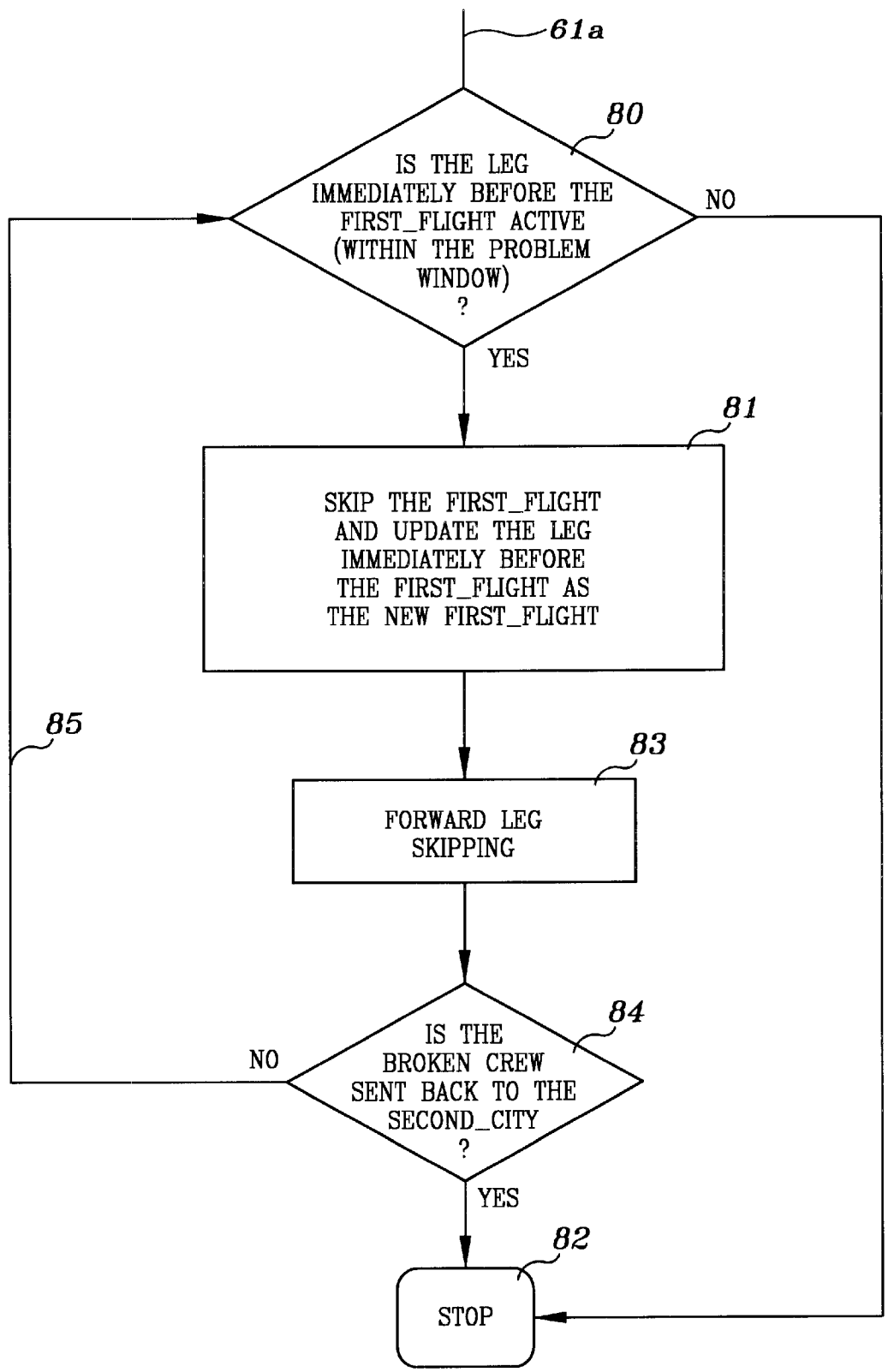
FIG. 7 is a logic flow diagram of the Backward-Leg Skipping Method occurring at logic step 62 of FIG. 5.

FIG. 7 illustrates in more detail the logic step 62 of FIG. 5. In the example where a First_Flight precedes a Broken Flight Leg, the logic flow process moves along logic path 61a to logic step 80 to determine whether the flight leg immediately preceding the First_Flight departs later than the Problem Start Time. If so, the logic flow process continues to logic step 81 where the First_Flight is skipped and the flight immediately preceding the First_Flight becomes the new First_Flight. If the flight immediately preceding the First_Flight at logic step 80 does not depart later than the Problem Start Time, the logic flow process jumps from logic step 80 to logic step 82 to cease the Backward Leg Skipping Method and continue to logic step 63 of FIG. 5.

From logic step 81 of FIG. 7, the logic flow process moves to logic step 83 to retry the Forward Leg Skipping Method of FIG. 6 with the corrected flight schedule. Then, at logic step 84 of FIG. 7, the destination station resulting from the operation at logic step 83 is tested to deter mine whether the Broken Crew has been sent to the new destination or Second_City. If not, the logic flow process loops back from logic step 84 along logic path 85 to logic step 80 to continue as before described. If the Broken Crew has been sent to the new destination (second airport), however, the logic flow process continues from logic step 84 to logic step 82 to proceed as before described.

Figures 8, 9:
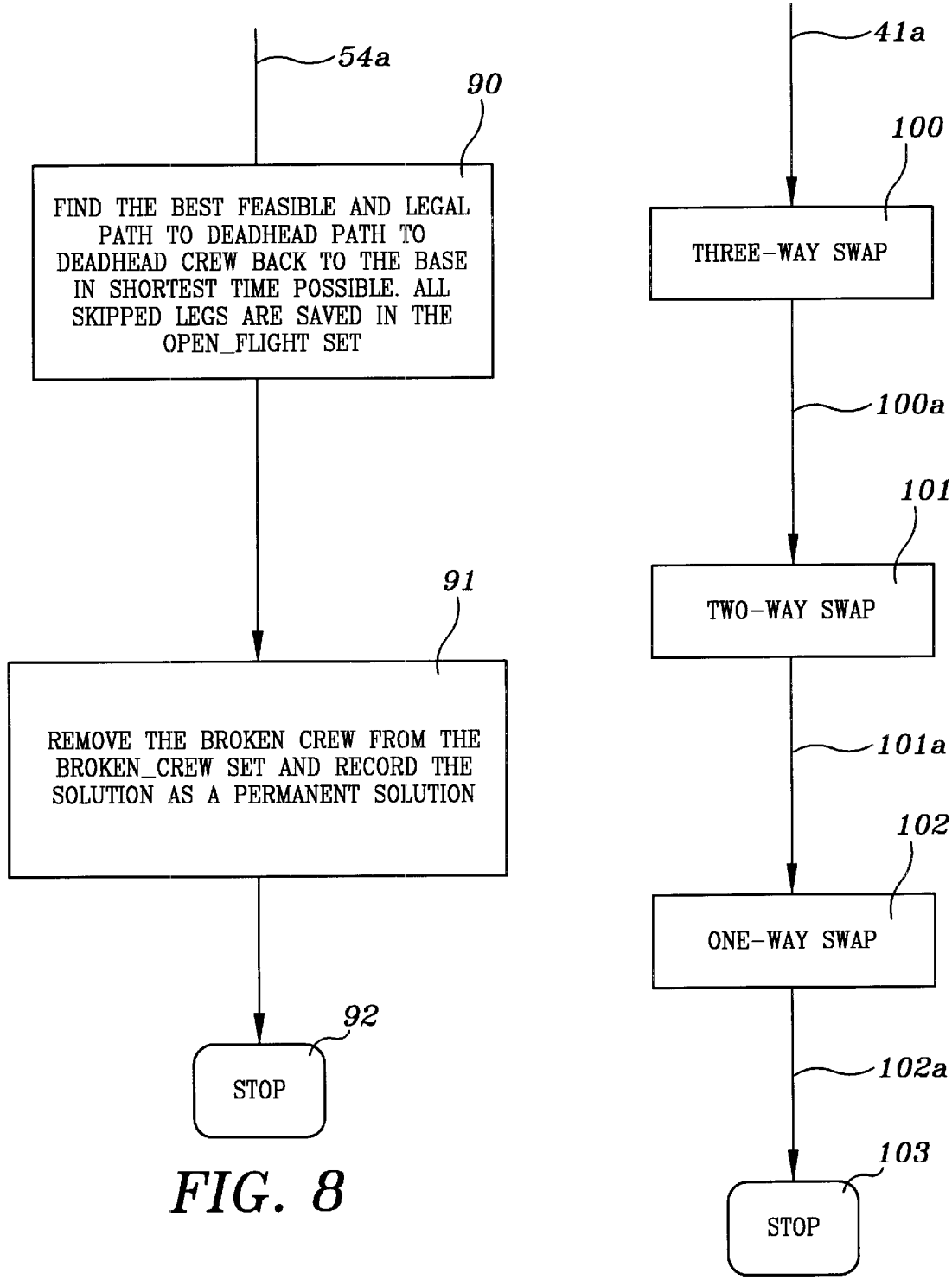
FIG. 8 is a logic flow diagram of the Extend-Out-Broken-Crew Method occurring at logic step 55 of FIG. 4.
FIG. 9 is a logic flow diagram of the swap process occurring at logic step 42 of FIG. 3.

Referring to FIG. 8, the Extend-Out-Broken-Crew Method of logic step 55 of FIG. 4 is illustrated in more detail. The logic flow process moves along logic path 54a of FIG. 4 to logic step 90 of FIG. 8 to generate a deadhead path which takes the Broken Crew back to its originating or base station in the shortest time, but which does not violate either user request parameters (feasible) or operations constraints (legal). All Flight Legs that are skipped to achieve the above goals are saved in an Open Paring set.

From logic step 90 the logic flow process continues to logic step 91 to remove the Broken Crew from the Broken Crew Set, and record the solution as a permanent solution. The logic flow process then proceeds to logic step 92 where the Extend-Out-Broken-Crew Method is terminated, and the process continues at logic step 56 of FIG. 4 as before described.

FIG. 9 illustrates in more detail the Swap Procedure of logic step 42 of FIG. 3, in which the logic flow process enters by way of logic path 41a to commence the operation of a Three-Way Swap Method at logic step 100 of FIG. 9. Thereafter, the logic flow process continues to logic step 101 to apply a Two-Way Swap Method to the Broken Crew problem, and thereafter proceeds to logic step 102 to apply a One-Way Swap Method. From logic step 102, the logic flow process moves to logic step 103 to enter logic step 43 of FIG. 3.

Figures 10, 11:
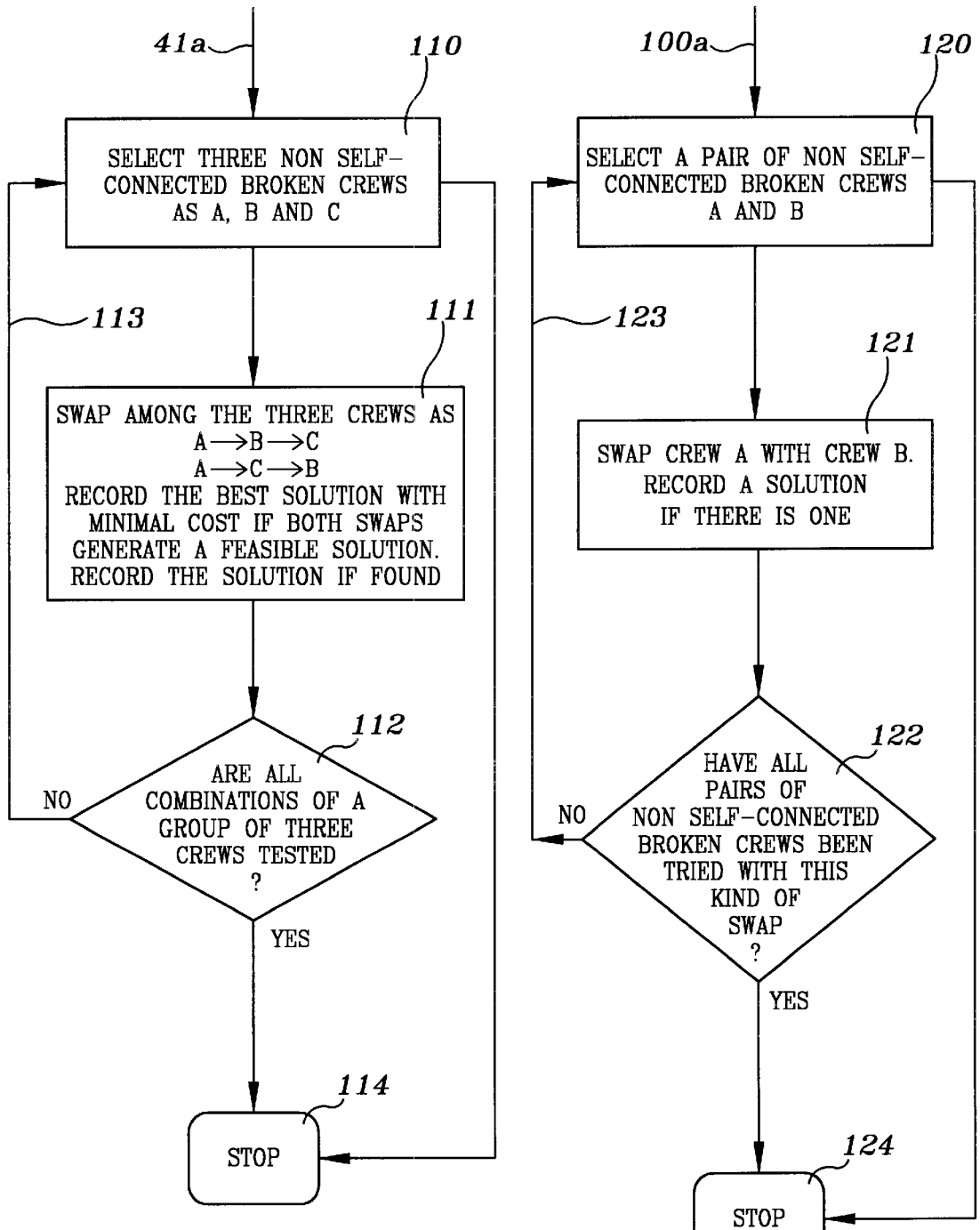
FIG. 10 is a logic flow diagram of the Three-Way Swap process occurring at logic step 100 of FIG. 9.
FIG. 11 is a logic flow diagram of the Two-Way Swap process occurring at logic step 101 of FIG. 9.

Referring to FIG. 10, the operation of the Three-Way Swap Method of logic step 100 of FIG. 9 is illustrated in more detail. More particularly, the logic flow process enters logic step 110 of FIG. 10 by way of logic path 41a to select three non-Self-Connected Broken Crews (A, B, C) from the Broken Crew set. The logic flow process then moves to logic step 111, where Flight Legs among the Pairings of A, B, and C are swapped as represented by A→B→C. More particularly, crew A may be assigned one or more Flight Legs of crew B's Pairing to generate a solution for Broken Crew A; B may be assigned Flight Legs of crew C's Pairing to fix Broken Crew B; and C may be assigned one or more Flight Legs of A's Pairing to fix Broken Crew C. Thereafter, a different Three-Way Swap may be generated, by way of example A→C→B. If feasible and legal solutions are generated, they are compared to select the least cost solution that is recorded as the permanent solution.

From logic step 111, the logic flow process continues to logic step 112 to determine whether all available triads of non-Self Connected Broken Crews have been processed as described above. If not, the logic flow process loops back by way of logic path 113 to logic step 110 to continue as before described. Otherwise, the logic flow process moves to logic step 114, where the Three-Way Swap Method is terminated and the process proceeds along logic path 100a of FIG. 9 to continue as before described. Further, in the event that no non-Self Connected Broken Crew exists in the Broken Crew set, the logic flow process jumps from logic step 110 to logic step 114 to proceed as before described.

Referring to FIG. 11, the operation of logic step 101 of FIG. 9 is illustrated in more detail, where the logic flow process enters logic step 120 of FIG. 11 by way of logic path 100a, and a pair of non-Self Connected Broken Crews (A and B) is selected from the Broken Crew set. Thereafter, at logic step 121, Flight Legs of each Broken Crew are swapped to attempt to fix both Broken Crew A and Broken Crew B. If a solution is found, it is recorded. The logic flow process then continues to logic step 122 to determine whether all pairs of non-Self Connected Broken Crews have been selected and operated upon by the Two-Way Swap Method. If not, the logic flow process loops back by way of logic path 123 to logic step 120 to continue as before described. If all such pairs have been so processed, however, the logic flow process continues from logic step 122 to logic step 124 to terminate the Two-Way Swap Method, and proceed along logic path 101a to logic step 102 of FIG. 9.

If all pairs of non-Self Connected Broken Crews have been found to have been processed at logic step 120, the logic flow process jumps directly to logic step 124 to continue as before described.

Figure 12:
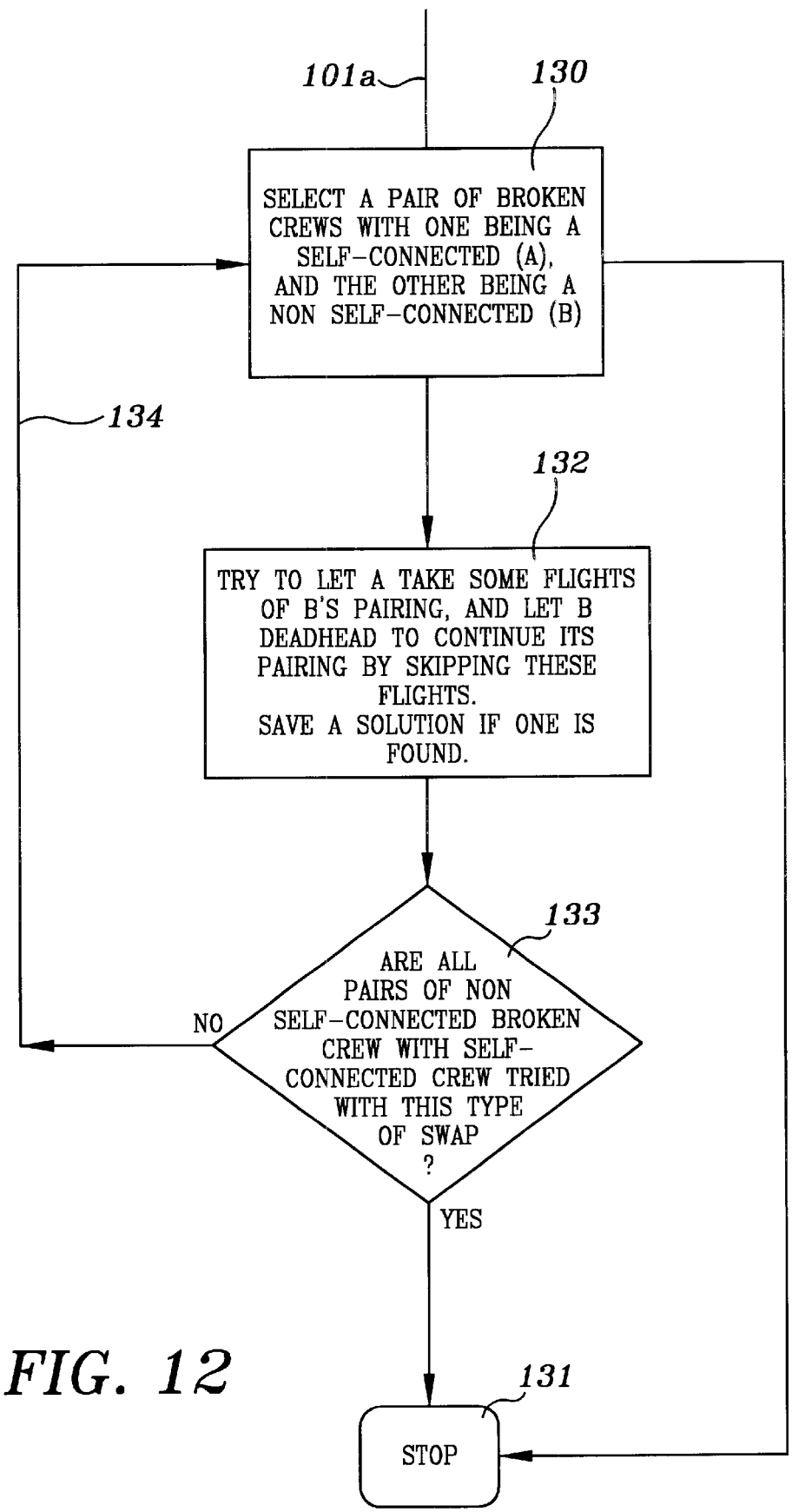
FIG. 12 is a logic flow diagram of the One-Way Swap process occurring at logic step 102 of FIG. 9.

Referring to FIG. 12, the One-Way Swap Method of logic step 102 of FIG. 9 is described in more detail. More particularly, the logic flow process enters logic step 130 by way of logic path 101a. One Self-Connected Broken Crew, by way of example referred to as crew A, and one non-Self-Connected Broken Crew, by way of example B, are selected from the Broken Crew set. If no such pair can be formed from the Broken Crew set, the logic flow process jumps immediately to logic step 131, where the One-Way Swap Method is exited and the logic flow process continues along logic path 102a of FIG. 9. If such a pair is selected at logic step 130 of FIG. 12, however, the logic flow process moves from logic step 130 to logic step 132 where an attempt to find a solution to cure Broken Crews A and B is made. More particularly, crew A is assigned one or more Flight Legs of crew B's Pairing, and a deadhead flight for crew B is formed to allow crew B to skip those flights of its Pairing assigned to crew A and to return to its original Pairing. If such a solution is found, it is recorded.

From logic step 132, the logic flow process continues to logic step 133 to determine whether all pairs comprising a Self-Connected Broken Crew with a non-Self-Connected Broken Crew have been selected from the Broken Crew set. If not, the logic flow process loops back along logic path 134 to logic step 130 to continue as before described. Otherwise, the logic flow process proceeds to logic step 131 to continue as before described.

Figure 13:
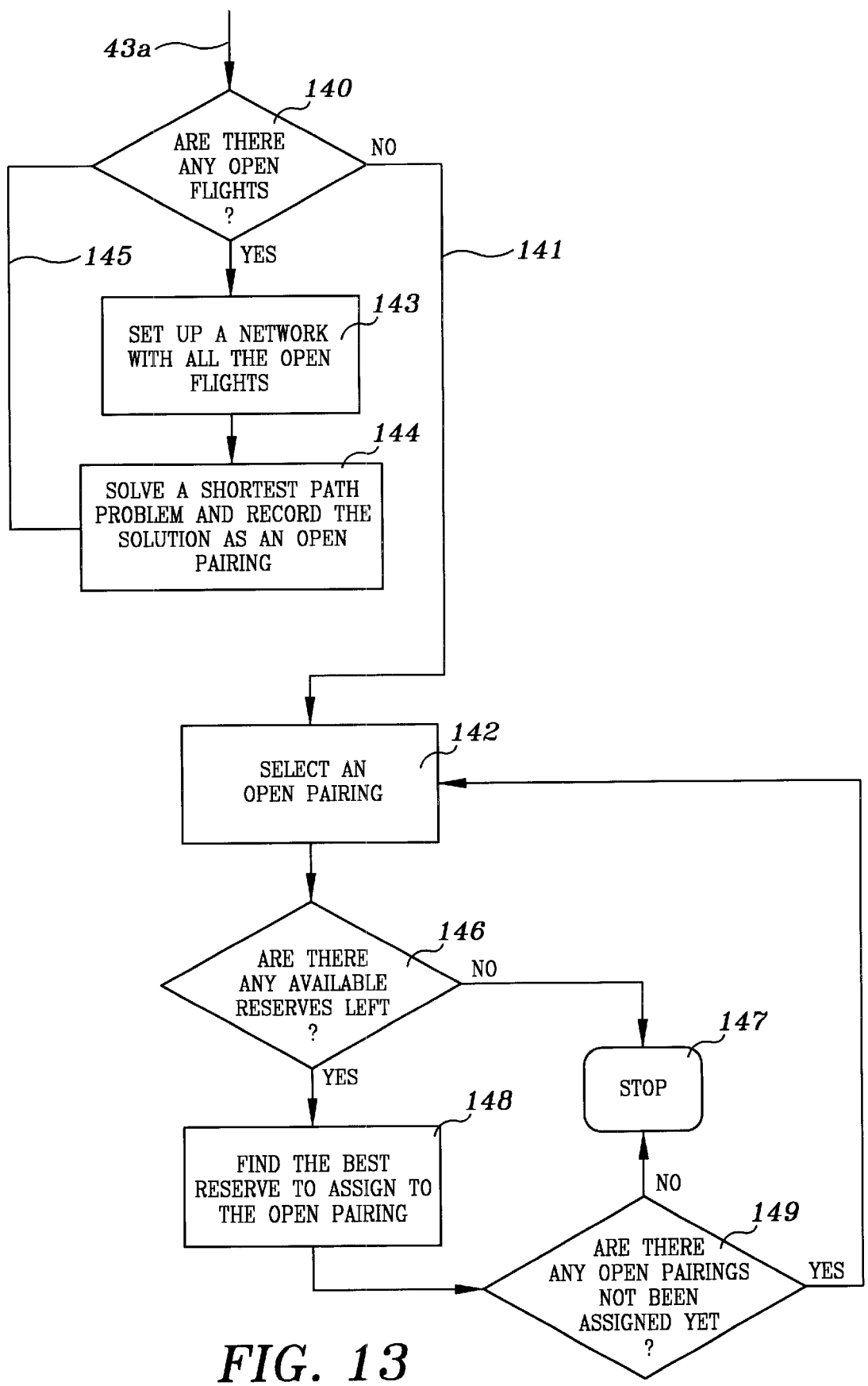
FIG. 13 is a logic flow diagram of the Use-Of-Reserves Method occurring at logic step 44 of FIG. 3.

FIG. 13 illustrates in more detail the operation of the Use-Of-Reserves Method of logic step 44 of FIG. 3. More particularly, the logic flow process proceeds along logic path 43a to logic step 140 of FIG. 13, where a determination is made whether there are any Open Flights indicated in the Open Flight set. If not, the logic flow process continues by way of logic path 141 to logic step 142 to select an Open Pairing from the Open Pairing set. If an Open Flight is found in the Open Flight set at logic step 140, the logic flow process continues from logic step 140 to logic step 143, where a network of Open Flights is generated. This network is set up in such a way that by solving a shortest path network problem, we would obtain a solution that is based on the criteria to select a flight sequence that involves as many open flights as possible and avoids deadhead flights as much as possible. In order to achieve this goal, some negative costs are set to all of the Open Flights, and some positive costs are set to the deadhead flights that connect any two Open Flights. As a result, the solution path would yield the lowest total cost possible as the "shortest path". The network is set up as follows: first a source node (a dummy node) and a destination node (another dummy node) are created. Geographically both nodes are assumed to be at the reserve crew's base city. Thereafter, a departure node and an arrival node for each Open Flight (geographically the departure node is at the flight's departure city and the arrival node is at the arrival city) are created. A cost of "−1" is assigned to each arc connecting a departure node to an arrival node for each Open Flight. A cost of "0" is assigned to each arc connected from the source node to each Open Flight's departure node, and to each arc connected from each Open Flight's arrival node to the destination node. Next, a deadhead path between one flight's arrival node and another flight's departure node is found, and if the time between the arrival time and the departure time allows sufficient connection time, the deadhead path is recorded. A cost of "1" is assigned to each arc of the deadhead path.

From logic step 143, the logic flow process continues to logic step 144 to determine a shortest path solution (lowest cost path), which is saved as an Open Pairing. The logic flow process then proceeds from logic step 144 and along logic path 145 to logic step 140 to determine whether there are any Open Flights left in the Open Flight set. If so, costs for Open Flights that have been assigned to an Open Pairing are reset to "1", and the process continues as before described. If no further Open Flights exist that have not been assigned to an Open Pairing, the logic flow continues along logic path 141 to logic step 142.

Once an Open Pairing is selected from the Open Pairing Set at logic step 142, the logic flow process continues to logic step 146 to determine whether there are any Reserve crews available. If not, the logic flow process jumps to logic step 147 to terminate the Use-Of-Reserves Method, and next proceeds to logic step 45 of FIG. 3 to continue as before described. If available Reserve Crews are found at logic step 146, however, the logic flow process moves to logic step 148 to find an optimal assignment of a Reserve Crew to the Open Pairing. That is, find a Reserve Crew, which would result in a lowest cost if assigned to the Open Pairing. From logic step 148, the logic flow process moves to logic step 149 to determine whether there are any Open Pairings which have not been assigned a Reserve Crew. If not, the logic flow process continues to logic step 147 to proceed as before described. If Open Pairings are found which are not covered by Reserve Crews, however, the logic flow process loops back along logic path 150 to logic step 142 to continue as before described.

Once Broken Crew Information (BCI) records are received to identify current problems in crew schedules, the above methods may be further described by way of examples beginning with the Preprocess stage.

For purposes of this description, assume that a flight sequence comprised of Flight Legs F1–F5 is respectively assigned to flights between stations A–E, with the last Flight Leg F5 returning to the original station A. Further, assume that a Broken Pairing condition occurs between stations C and D. That is, for whatever reason, Flight Leg F3 does not take place. The associated BCI records the Broken Pairing as follows:

First_Time=F2's arrival time
Second_Time=F4's departure time
First_City=C
Second_City=D
Swap Rank flag is initialized to "−1"

If between C and D two or more flights have been canceled, then it is possible that C=D. This is the case where the BCI can be fixed directly. The fix is saved as one of the possible solutions. The Swap Rank flag then is set to "0" to indicate a Self-Directly-Connected BCI, where the BCI is checked to see if the BCI's First_City is also the BCI's Second_City.

If a deadhead path P can be found which feasibly connects stations C and D, and if the new Pairing resulting from the deadhead path is feasible and legal for all crews affected by the Pairing, a Self-Indirectly-Connected BCI is said to have occurred. In this event, the Swap Rank is set to "1".

The deadhead path P may consist of two Flight Legs, one from station C to station F, and a second from station F to station D. The deadhead path P is legal for all affected crews when there is sufficient connection times at both ends, C and D, of the Broken Pairing.

If we fail to fix the BCI using the Self-Directly-Connected and the Self-Indirectly-Connected Methods, a Skip Leg method is used. That is, beginning at station C, a first deadhead path P1 from C to E is evaluated, with station D and Flight Leg F4 having been skipped. If deadhead path P1 is not legal for all affected crews, e.g. sufficient connection times at station C and station E do not exist, then a deadhead path P2 from station C to the original station A is considered. Stations D and E, and corresponding Flight Legs F4 and F5, thereby are skipped. The process is continued by skipping an additional Flight Leg at a time, until either a legal deadhead path is found, or there are no more Flight Legs left to skip.

If the Forward Skip Leg Method fails to provide a BCI fix, a Backward Skip Leg Method is used. Starting with Flight Leg F2, if the leg's departure time is later than the Request Time plus a predefined Notification Time (time required to notify crew members about any schedule changes), then Flight Leg F2 is redefined to be the Second_Flight leg of a deadhead path, and the Forward Skip Leg Method again is used. If a legal deadhead path is not found, one more leg before the original First_Flight is skipped as long as the skipped Flight Leg's departure time is later than the Request Time plus the Notification Time.

If one of the Skip Leg Methods succeeds, the result is saved as one of the possible solutions, and the skipped legs are stored in an Open Leg Set.

If both the Forward Skip Leg and the Backward Skip Leg Methods fail, the Broken Crew can not be sent back to its base or original station on time, even if the crew members skip all remaining Flight Legs. In this circumstance, an Extend-Out-Broken-Crew Method is used in which the crew is allowed to skip all remaining Flight Legs of the flight sequence, and to deadhead back to their original station A at the earliest possible time to minimize the crew's extended out time. The result of the Extend-Out-Broken-Crew Method is saved as a solution of the BCI, and the BCI is removed from the BCI Set as it has been fixed.

At the end of the above Preprocess stage, all solutions that have been found are evaluated. Costs associated with each possible solution are computed and saved. Costs are influenced by factors including 1) number of deadhead paths used; 2) number of Flight Legs skipped; and 3) number of minutes a crew is extended out.

Next, an attempt is made to find better solutions by swapping two or three BCIs to minimize the number of skipped legs.

In a Three-Way Swap Method, an exhaustive search is initiated to find all possible swap solutions. However, only the non-Self-Connected BCIs (Swap Rank="−1") are tried. By way of description of a Three-Way-Swap only, assume three BCI's respectively representing flight sequences FS1, FS2, and FS3. FS1 is comprised of Flight Legs F11–F14 with a Broken Pairing occurring between F11 and F12; FS2 is comprised of Flight Legs F21–F24 with a Broken Pairing occurring between F22 and F23; and FS3 is comprised of Flight Legs F31–F33 with a Broken Pairing occurring between the originating station and F31. FS1 may be fixed by deadheading to take flights F23 and F24 of FS2, and then deadheading back to the destination of Flight Leg F14. FS2 may be fixed by deadheading to take Flight Legs F31, F32, and F33 of FS3, and then deadheading back to the destination of F14. Lastly, FS3 is fixed by deadheading to take flights F12, F13, and F14 of FS1, and then deadheading back to the destination of F33. Thus, a solution has been found which fixes each of the three BCIs at the same time. The costs of the solution then are computed and recorded.

In practice it is common that 1) after a first flight sequence is repaired by taking flights of another flight sequence, the first flight sequence can come back to continue taking more of its own flights; and 2) a deadhead path can be of zero length.

After the Three-Way Swap Method is used, a Two-Way Swap Method is used, where an exhaustive search is initiated to find all possible two-way swaps between any two non-Self-Connected BCIs. As before, flight sequence FS1 is comprised of Flight Legs F11–F14 with an Open Pairing between Flight Leg F11 and Flight Leg F12, and flight sequence FS2 is comprised of Flight Legs F21–F24 with an Open Pairing occurring between Flight Leg F21 and Flight Leg F22.

In this example, FS1 is fixed by deadheading to take FS2's flights F22 and F23, and then deadheading back to continue its own pairing at F14. On the other hand, FS2 is fixed by deadheading to take FS1's flights F12 and F13, and then deadheading back to continue its own pairing at F24.

When a solution is found, the associated cost is calculated and the solution is stored.

After the Two-Way Swap Method is exercised, a One-Way Swap Method involving one non-Self-Connected BCI and one Self-Connected BCI is used. Again, an exhaustive search is initiated to find all possible solutions. In this example, a non-Self-Connected BCI is represented by flight sequence FS1, and a Self-Connected BCI (either a Self-Directly-Connected or Self-Indirectly-Connected BCI) is represented by flight sequence FS2. FS1 is comprised of Flight Legs F11–F14 with an Open Pairing between F11 and F12. FS2 is comprised of Flight Legs F21–F24 with a first Open Pairing between Flight Legs F21 and F22, and a second Open Pairing between Flight Legs F22 and F23. FS2 is fixed by deadheading after Flight Leg F21 to take FS1's flight F12, and then deadheading back to continue its own Pairing at Flight Leg F23. FS1 is fixed by skipping Flight Leg F12, and deadheading to continue its own Pairing at Flight Leg F13. As before, the solution cost is computed and stored.

Once all BCI solutions are found, a matching method is applied. In this method, a generally known depth-search-first algorithm is used to find an optimal overall solution. The algorithm is disclosed at page 356 of "Data Structures and Algorithm Analysis in C++", by Mark Allen Neiss, Addison-Wesley Publishing Company (1994). Since at least one solution (the worst case will be the solution that skips some flights) exists to fix a Broken Crew, the Matching Method will provide multiple feasible solutions. The final solutions are ranked based on their costs. For each solution, any skipped flights are saved in an Open-Leg set.

For each feasible and legal solution obtained, Reserve Crews are used to cover Open Pairings and Open Legs. There are three steps involved in using Reserve Crews.

In the first step, Open Pairings are created that are based on the Open Legs in the Open-Leg Set. Given an original crew base C1 (where crew reserves for a given fleet type may be available), a network of Open Legs is prepared. For example, in a network of five Open Legs F1, F2, F3, F4, and F5, the original crew base C1 is connected by an arc to the departure node of each flight. In addition, the arrival node of each flight is connected by an arc to the destination node C2. Thereafter, the cost for each arc of the network is set. Arcs connecting any two Flight Legs are set to "0", arcs representing Open Legs are set to "−1", and deadhead Flight Legs are set to "1".

Next, the generally known shortest path algorithm is applied to the network to identify a shortest path as an Open Pairing. Thereafter, the cost of the Flight Legs assigned to the Open Pairings (which are becoming deadhead Flight Legs to other paths) is set to "1", and the algorithm continues to be exercised until every Flight Leg is assigned to one of the Open Pairings. The resulting Open Pairings then are stored in the Open Pairing set.

In the second step, an attempt is made to assign a Reserve Crew to each Open Pairing. The process is continued for each Open Pairing until a first legal and feasible assignment is found. That is, not only is there a sufficient connection time at the departure and arrival nodes, but also the legality constraints have not been violated. If no assignment can be made for an Open Pairing, the Open Pairing is placed in a new Open Pairing Set.

Lastly, in the third step, an Open Pairing in the new Open Pairing. Set is operated upon by removing one non-deadhead Flight Leg at a time, and attempting to assign available crew reserves to the Open Pairing. The process is continued until either a successful assignment is made, or no further non-deadhead Flight Legs exist in the Open Pairing. Each Open Pairing in the Open-Pairing Set is similarly operated upon. All removed Flight Legs are saved in a temporary Uncovered-Leg Set.

The Uncovered-Leg Set then is set to be the Open Leg set, and the above process beginning with the first step is repeated. If Open Legs still are left uncovered, the uncovered legs are recorded as a partial solution.

What is claimed is:

1. An automated, real time crew optimization engine for generating multiple solutions in assigning crews to cure open flights, open pairings, and broken crews, which comprises a memory system having stored therein memory objects defining all flight and crew schedules of an airline;

an optimization server receiving information from a user including flight records, pairing records, crew records, and solution constraints, and a user request to solve at least one of a current crew problem and a set of user defined what-if scenarios;

a microprocessor in electrical communication with said memory system and said optimization server, and receiving said memory objects, said information, and said user request for updating said memory objects, identifying open flights, open pairings, and broken crew problems, selecting those crew problems which are in conformance with said solution constraints, preprocessing selected ones of said crew problems to generate potential solutions, optimizing said potential solutions by executing swap methods, matching methods, and a use-of-reserve method, and providing optimized solutions to said user.

2. The automated real time crew optimization engine of claim 1, wherein said skipping-leg method includes at least one of a forward leg skipping method and a backward leg skipping method.

3. The automated real time crew optimization engine of claim 2, wherein said skipping-leg method includes a forward leg skipping method and a backward leg skipping method.

4. The authorized real time crew optimization engine of claim 2, wherein said self-connection methods include at least one of a self-directly-connected method and a self-indirectly connected method.

5. The automated real time crew optimization engine of claim 1, wherein said swap methods include at least one of a one-way swap method, a two-way swap method, and a three-way swap method.

6. The automated real time crew optimization engine of claim 1, wherein said matching methods include a depth-search-first algorithm.

7. The automated real time crew optimization engine of claim 1, wherein said use-of-reserve method includes a shortest path algorithm.

8. A method of repairing open flights and open pairings in airline operations, which comprises the steps of:

receiving memory objects from a memory system that defme all flight and crew schedules of an airline;

receiving from a user by way of an optimization server information including flight records, pairing records, and crew records for updating said memory objects, and a request for multiple solutions for at least one of a specific crew problem and user defined what-if scenarios;

identifying from said information any flight schedule problems including open flights and open pairings which conform with solution constraints;

generating a broken crew set from said any flight schedule problems, and selecting a broken crew problem conforming with said solution constraints from said broken crew set;

applying a self-connected method to said broken crew problem to repair said broken crew problem to become a corrected broken crew problem, saving said corrected broken crew problem as a potential solution candidate, and selecting any remaining broken crew problem in said any flight schedule problems as said broken crew problem and repeating the above steps beginning with the step of applying a self-connected method;

if said broken crew problem is not corrected, applying a skipping leg method to said broken crew problem, and if said broken crew problem is corrected to become said corrected broken crew problem, saving said corrected broken crew problem as a potential solution candidates and selecting any remaining broken crew problem in said any flight schedule problems as said broken crew problem and repeating the above steps beginning with the step of applying a skipping leg method;

if said broken crew problem is not corrected by said skipping leg method, applying an extend-out-broken-crew method to said broken crew problem to generate a deadhead path to the originating station of a broken crew of said broken crew problem in a shortest time in conformance with said solution conditions to ensure feasibility;

if said deadhead path is generated, saving said deadhead path as a permanent solution, and selecting any remaining broken crew problem in said any flight schedule problems as said broken crew problem and repeating the above steps beginning with the step of applying said extend-out-broken-crew method;

repeating the above steps until all broken crew problems in said any flight schedule problems have been processed, and if any broken crew problem exists in said broken crew set, selecting one of said any broken crew problems, and applying plural swap methods to said one of said any broken crew problems to generate alternative solutions which are saved as potential solutions, and repeating the steps of selecting one of said any broken crew problems and applying plural swap methods until all broken crew problems in said broken crew set have been processed;

applying a depth-search-first algorithm to said potential solutions to find an optimal solution for each of said broken crew problems and saving said optimal solution in a first optimal solution set;

determining whether an open flight problem exists in said any flight schedule problems, and if so, generating a network of open flights;

applying a shortest path algorithm to said network to generate and save as an open pairing a flight sequence that involves as many open flights as possible and avoids deadhead paths as much as possible;

repeating the above steps of determining whether an open flight problem exists and applying a shortest path algorithm until all open flights in said any flight schedule problems have been processed;

if no open flights exist in said any flight schedule problems, determining whether any open pairings exist in said any flight schedule problems;

if so, selecting one of said any open pairings and determining whether any reserve crews exist to assign to said one of said any open pairings;

if reserve crews are found, determining an assignment of one of said reserve crews which results in an optimal assignment to said one of said any open pairings which is based upon least cost to said airline and which is saved as a permanent solution in a second optimal solution set; and searching said any flight schedule problems for further open pairings without assigned crews and repeating the above steps beginning with the step of selecting one of said any open pairings until all open pairings in said any flight schedule problems have been processed.

9. The method of claim 8, wherein said skipping leg method is comprised of at least one of a forward leg skipping method, and a backward leg skipping method.

10. The method of claim 8, wherein said plural swap methods include at least one of a three-way swap method, a two-way swap method, and a one-way swap method.

11. The method of claim 8, wherein said self-connected method includes at least one of a self-directly connected method and a self-indirectly connected method.

12. The method of claim 8 further including the step of providing said first optimal solution set and said second optimal solution set to said user.

13. An automated real time crew optimization method for generating in a microprocessor multiple solutions in assigning crews to cure broken crew problems, wherein said microprocessor is part of a system comprised of said microprocessor, a memory system, and an optimization server in electrical communication, which comprises the steps of:

receiving a user request for solutions by way of said optimization server, and memory objects from said memory system that define all flight schedules, crew schedules, and solution constraints for an airline;

selecting said open flights and said open pairings from said user request and said memory objects, and broken crew problems in conformance with said solution constraints from said open flights and said open pairings;

preprocessing said broken crew problems by using at least one of a self-connected method, a skipping leg method, and an extend-out-broken-crew method to generate first potential solutions;

if any remaining broken crew problems exist for which no solutions were found, preprocessing said remaining broken crew problems by applying plural swap methods to generate second potential solutions; and applying a matching algorithm to said potential solutions to find an optimal solution.

14. The automated real time crew optimization engine of claim 13, wherein said skipping leg method is comprised of at least one of a forward leg skipping method, and a backward leg skipping method.

15. The automated real time crew optimization engine of claim 13, wherein said plural swap methods include at least one of a three-way swap method, a two-way swap method, and a one-way swap method.

16. The automated real time crew optimization engine of claim 13, wherein said self-connected method includes at least one of a self-directly connected method and a self-indirectly connected method.

17. The automated real time crew optimization engine of claim 13, wherein said matching methods include a depth-search-first algorithm.

18. An automated real time crew optimization method for generating in a microprocessor multiple solutions for open flights and open pairings, wherein said microprocessor is part of a system comprised of said microprocessor, a memory system, and an optimization server in electrical communication, which comprises the steps of:

receiving information from a user and memory objects from said memory system that define all flight schedules, crew schedules, and solution constraints for an airline, identifying to said user said open flights and said open pairings in conformance with said solution constraints; and broken crew problems in conformance with said solution constraints from said open flights and said open pairings;

upon receipt of a user request, generating first optimal solutions by applying at least one of a self-connected method, a skipping leg method, an extend-out-broken-crew method, and plural swap methods to said broken crew problems to generate first plural solutions;

applying a depth-search-first algorithm to said first plural solutions to provide first optimal solutions;

applying a shortest path algorithm to said open flights to generate as potential open pairing solutions flight sequences in conformance with said solution constraints which include as many of said open flights as possible and avoid as many deadhead paths as possible;

assigning reserve crews to said potential open pairing solutions; and determining second optimal solutions of said potential open pairing solutions based upon cost to said airline.

19. An automated, real time crew optimization engine for generating multiple solutions in assigning crews to cure open flights, open pairings, and broken crews, which comprises:

a memory system having stored therein memory objects defining flight and crew schedules and solution constraints of an airline;

an optimization server receiving information from a user for updating said memory system and requesting solutions to said open flights, said open pairings, and said broken crew problems; and a microprocessor in electrical communication with said memory system and said optimization server, and receiving said information from said optimization server, for updating said memory objects and identifying from said memory objects and said information open flight, open pairing, and broken crew problems in conformance with said solution constraints, generating first potential solutions by applying at least one of self-connected, skipping leg, extended-out-broken-crew, and swap methods to said broken crew problems in conformance with said solution constraints, optimizing said first potential solutions by applying a depth-search-first algorithm to said first potential solutions to provide first optimal solutions; applying a shortest path algorithm to remaining open pairings and remaining open flights in conformance with said solution constraints to generate second potential solutions, assigning reserve crews to said second potential solutions, and selecting second optimal solutions from said second potential solutions based upon cost to said airline.

* * * * *